United States Patent
Voticky et al.

(10) Patent No.: US 6,351,764 B1
(45) Date of Patent: Feb. 26, 2002

(54) SYSTEM AND METHOD FOR PRIORITIZING COMMUNICATIONS MESSAGES

(76) Inventors: Michael Voticky, 708 Elder Cir., Austin, TX (US) 78733; Joe Conner, 3350 NW. 53rd Cir., Boca Raton, FL (US) 33496

( * ) Notice: Subject to any disclaimer, the term of this patent is extended or adjusted under 35 U.S.C. 154(b) by 0 days.

(21) Appl. No.: 09/224,148

(22) Filed: Dec. 31, 1998

(51) Int. Cl.[7] .............................................. G06F 13/00
(52) U.S. Cl. ...................................... 709/207; 709/206
(58) Field of Search ................................ 709/103, 203, 709/207, 206, 314, 315; 706/45, 47; 707/10, 6, 526

(56) References Cited

U.S. PATENT DOCUMENTS

| | | |
|---|---|---|
| 5,229,764 A | 7/1993 | Matchett et al. |
| 5,377,354 A * | 12/1994 | Scannell et al. ............ 709/103 |
| 5,745,591 A | 4/1998 | Feldman |
| 5,748,709 A | 5/1998 | Sheerin |
| 5,751,835 A | 5/1998 | Topping et al. |
| 5,757,891 A | 5/1998 | Wang |
| 5,966,351 A | 10/1999 | Carleton et al. |
| 5,974,414 A | 10/1999 | Stanczak et al. |
| 5,999,932 A * | 12/1999 | Paul ........................... 709/207 |

FOREIGN PATENT DOCUMENTS

| | | |
|---|---|---|
| EP | 0420779 A3 | 4/1991 |
| EP | 05880101 A3 | 8/1993 |
| EP | 0825752 A3 | 2/1998 |

* cited by examiner

*Primary Examiner*—Robert B. Harrell
(74) *Attorney, Agent, or Firm*—Akin Gump Strauss Hauer & Feld, LLP (57) ABSTRACT

A method of sorting a received information message in which a source of delivery of the message is indicated by a unique identifier accompanying the message, for example, in an e-mail or voice message system. The method includes steps of receiving the message, looking-up the identifier in a database, assigning a code for the message per the result of the step of looking-up, and prioritizing or forwarding the message according to the code.

33 Claims, 4 Drawing Sheets

| 11-Oct-98 02:21 PM | | | | |
|---|---|---|---|---|
| | | SORTMAIL INCOMING MAIL | | |
| DATE | SENDER | SUBJECT | TIME | PRIORITY |
| 09-Sep-98 | JC@AOL.COM | VACATION | 11:01 AM | A |
| 09-Sep-98 | BFD@MSN.COM | NEW VP | 07:06 PM | A |
| 10-Sep-98 | SDF@WEB.COM | HI | 12:16 PM | A |
| 10-Sep-98 | RF@AOL.COM | HELP | 04:14 PM | A |
| 09-Sep-98 | WINH@AOL.COM | ORDERS | 02:24 AM | B |
| 10-Sep-98 | IKIN@MP.COM | ANSWER | 01:36 AM | B |
| 10-Sep-98 | SDI@MSN.COM | REPLY | 02:24 PM | B |
| 10-Sep-98 | FPU@MPE.COM | WHEN | 11:59 AM | B |
| 09-Nov-98 | GHT@WE.COM | NEED HELP | 07:12 PM | B |
| 09-Sep-98 | WIFE@MN.COM | SUPPER | 09:26 AM | C |
| 11-Sep-98 | KID@MN.COM | MONEY | 10:31 AM | C |
| 03-Sep-98 | WWWWWW | MONEY | | X |
| 04-Sep-98 | XXX@COM | DEX | | X |
| 05-Sep-98 | ATELCO@MSN | LONG DISTANCE | | X |
| 06-Sep-98 | CON@AOL.COM | BIG BUSINESS | | X |
| 06-Sep-98 | $$$$$$@COM | MAKE MONEY | | X |
| READ | SAVE | DELETE | KEEP | REPLY |

FIG.3

SORTMAIL INCOMING MAILBOXES

11-Oct-98 07:29 PM

INTEROFFICE MAIL

| DATE | TIME | FROM | SUBJECT |
|---|---|---|---|
| 09-Sep-98 | 02:24 AM | WINH@aol.COM | ORDERS |
| 10-Sep-98 | 01:36 AM | ikin@mp.com | ANSWER |
| 10-Sep-98 | 02:24 PM | SDI@MSN.COM | REPLY |
| 10-Sep-99 | 12:00 PM | FPU@ME.COM | WHEN |
| 09-Nov-98 | 07:12 PM | GHT@WE.COM | NEED HELP |

PRIORITY OUTSIDE EMAIL

| DATE | TIME | FROM | SUBJECT |
|---|---|---|---|
| 09-Sep-98 | 11:01 AM | JC@AOL.COM | VACATION |
| 09-Sep-98 | 07:06 PM | BFD@MSN.COM | NEW VP |
| 10-Sep-98 | 12:16 PM | SDF@WEB.COM | HI |
| 10-Sep-98 | 04:14 PM | RF@AOL.COM | HELP |

OUTSIDE NON-PRIOR MAIL

| DATE | TIME | FROM | SUBJECT |
|---|---|---|---|
| 09-Sep-98 | 09:26 AM | WFE@MN.COM | SUPPER |
| 11-Sep-98 | 10:31 AM | KID@MN.COM | MONEY |

JUNK/UNSOLICITED MAIL

| DATE | TIME | FROM | SUBJECT |
|---|---|---|---|
| 03-Sep-98 | | WWWWWW | MONEY |
| 04-Sep-98 | | XXX@COM | SEX |
| 05-Sep-98 | | ATELCO@MSN | LONG DISTANCE |
| 06-Sep-98 | | CON@AOL.COM | BIG BUSINESS |
| 06-Sep-98 | | $$$$$$@COM | MAKE MONEY |
| 06-Sep-98 | | 123@SEX.COM | GO TO TOPLES |

READ   SAVE   DELETE   KEEP   REPLY

FIG. 4

SYSTEM AND METHOD FOR PRIORITIZING COMMUNICATIONS MESSAGES

BACKGROUND OF THE INVENTION

The present invention relates to information technologies and, more particularly, relates to systems and methods for prioritizing communications, such as e-mail and voice messages.

Communications and information technologies systems and processes are attracting significant attention and innovation. The many new developments and venues for communications and information transfers is increasingly becoming overwhelming in quantity of exchanges between communicators. E-mail and voice messages are typical examples.

With e-mail, so-called "spam" and other widely broadcast or unimportant and undesired information communications have become problematic. The typical recipient of e-mail must sift through numerous received messages of varying importance to the user. Prioritizing or otherwise segrating received e-mails presently requires that the user actively make determinations "on the fly" as each e-mail is viewed or read. The same is true with voice mail messages, which similarly accumulate and must each be listened to or otherwise segregated or discarded through the user's active involvement.

Various filters are being presently proposed and employed. For example, e-mail filters at the server computer may prevent certain e-mails from ever reaching the intended recipient. The filters are typically software that identify some word or characteristic of a message and systematically discard those messages, so they are never downloaded to the user. The filter software is presently typically maintained at the server computer.

The present quantity of communicated information, particularly on e-mails and voice messages, coupled with inadequacies of the present filtering mechanisms, particularly those maintained at the server of the information, are problematic. The intended recipient of the messages must actively sift through each message, prioritizing and discarding messages, as appropriate, through active involvement of the user in the process. Otherwise, software or other filters, which remove the required user involvement, arbitrarily discriminate between messages to discard and prioritize the messages, notwithstanding preferences or appropriateness of such filtering to the particular intended recipient. The intended recipient may, for example, want to receive certain messages that are being discarded or prioritized in an inappropriate manner for the particular recipient user. Alternately, the intended recipient may receive messages that the recipient does not want to receive.

Certain present filtering or differentiation mechanisms allow the recipient some degree of discretion in setting the discriminating characteristics. These present mechanisms, however, offer very limited flexibility, if any, to the recipient. In any event, although the recipient may have some discretion in setting the filter characteristics or other mechanisms for discriminating between messages, the recipient has little discretion once those characteristics are set. The intended recipient, thus, has little ability to change or vary priorities and discrimination characteristics "on the fly" in real time.

The present invention provides advantages of providing the intended recipient greater flexibility in prioritizing and discriminating among communicated information that is received. The advantages presented are significant to the technology and art.

SUMMARY OF THE INVENTION

An embodiment of the invention is a method of sorting a received information message. A source of delivery of the message is indicated by a unique identifier accompanying the message. The method includes steps of receiving the message, looking-up the identifier in a database, assigning a code for the message per the result of the step of looking-up, and prioritizing the message according to the code.

Another embodiment of the invention is a system for sorting a received information message. A source of delivery of the message is indicated by a unique identifier accompanying the message. The system includes a database maintaining known identifiers and desired codes corresponding to the known identifiers. The system also includes a designated code different from the desired codes. The system includes means for receiving the message, means for looking-up the unique identifier in the database to determine whether the unique identifier is the same as any of the known identifiers in the database, a data code, the data code is either: (i) if the unique identifier is the same as one of the known identifiers, the one of the desired codes that corresponds to the one of the known identifiers in the database that is the same as the unique identifier, or (ii) otherwise, the data code is the designated code, means for assigning the data code for the message, and means for prioritizing the message according to the data code.

Another embodiment of the invention is a computer-readable medium of instructions. The computer-readable medium of instructions includes a message, a unique identifier corresponding to the message, means for receiving the message and the unique identifier, a database containing known identifiers and desired codes respectively corresponding to the known identifiers, a designated code, means for looking-up the unique identifier in the database to determine whether the unique identifier is the same as any of the known identifiers in the database, a data code, the data code is either: (i) if the unique identifier is the same as one of the known identifiers, the one of the desired codes that corresponds to the one of the known identifiers in the database that is the same as the unique identifier, or (ii) otherwise, the designated code, means for assigning the data code for the message, and means for prioritizing the message according to the data code.

DETAILED DESCRIPTION

As used in this detailed description, the following terms have the following respective meanings:

A "client" is a functional unit of a communications network, such as a computer connected to a network, that requests and receives shared services of a server of the communications network. Although the client is generally considered as the user's computer on which information is ultimately received and initially transmitted, the client (according to the description herein) can be any computer or other device of the network that can download and upload communicated information of the network. Thus, the client can be an Internet service provider's computers, an Internet portal site, or any other location of the network at which communications are received and can be prioritized and accessed according to such prioritization.

The term "client-server" refers to a model of interaction in a communications network in which a computer at one site (i.e., a client) sends a request to a computer at another site (i.e., a server) and awaits a response, and the computer receiving the request (i.e., the server) satisfies the request with a response to the requesting computer (i.e., the client).

A "server" is a functional unit or a communications network, such as a computer connected to the network, that receives requests and provide shared services to clients over the communications network.

A "user" is a person or thing, associated with a functional unit of a communications network, that is communicating on the network.

Figure 1:
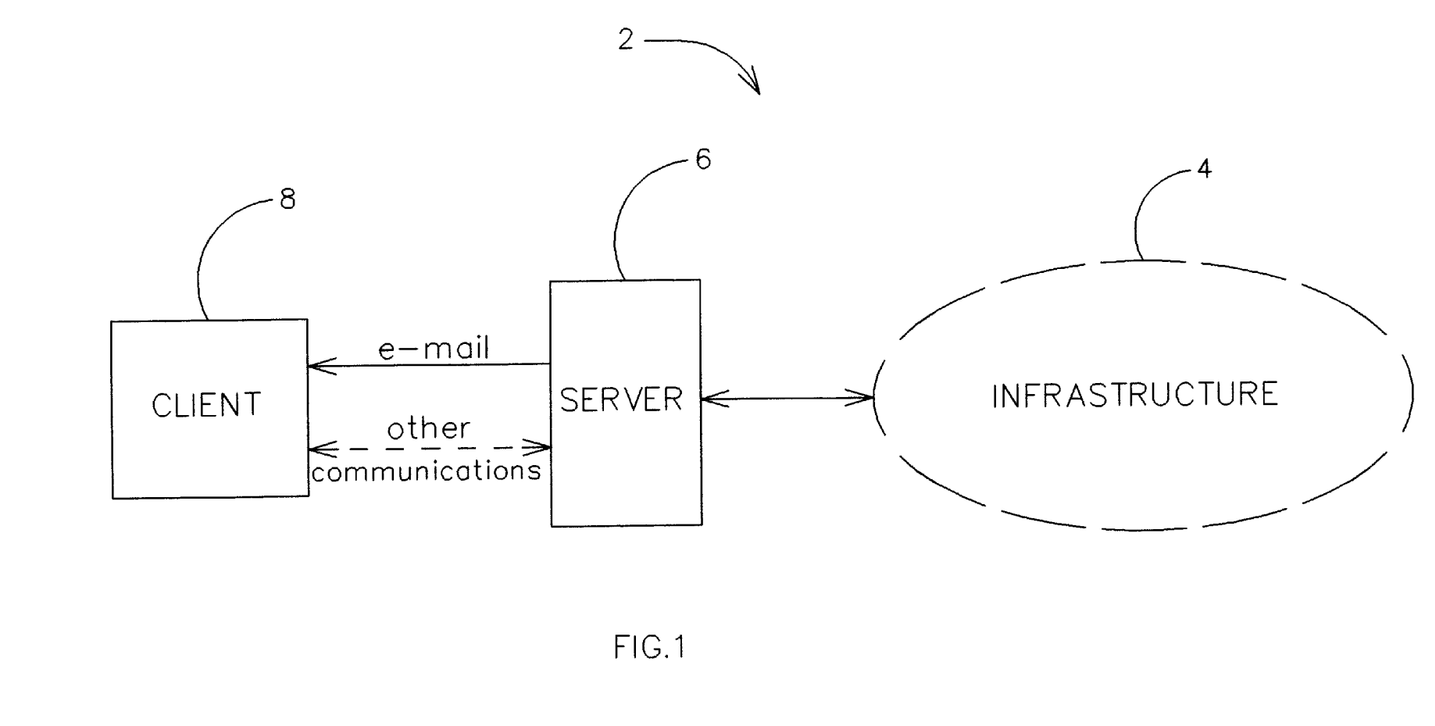
FIG. 1 is a typical communication system for e-mail exchange among a network, including a server computer and a client computer.

Referring to FIG. 1, a communications network 2 includes a communications infrastructure 4, a server 6, and a client 8. The infrastructure 4 is a thoroughly communicatively interconnected series of communicating user units and associated interconnection, switching, routing and other communications elements of a conventional communications network structure. The infrastructure 4 is connected to the server 6. The server 6 is connected to the client 8. The term client, as used herein, can however be what is conveniently considered as a server, such as an Internet service provider, a portal site, or any other networked device, and is not intended as limited to identify only a user's computer. Client-server references are merely used here to describe the functional activity of particular networked devices and how communication insterations can occur on a network. The present invention is operable on any computer serving as a client (even if it also serves as a server) and, therefore, the systems and methods of the present invention can be physically located on computers of a Internet service provider, a portal site, or any other networked site.

The communications network 2 operates in a conventional manner. Communications travel over the infrastructure 4 and arrive for storage on the server 6. The client 8 requests communications information from the server 6. The server 6 then allows the client 8 to download the communications information from the server 6. If the communications information is e-mail messages, the e-mail is downloaded by the client 8 from the server 6.

Conventionally, any filter or discrimination mechanism for discarding or prioritizing e-mail messages is maintained on the server 6. The server 6 causes the discrimination and discarding, and the client 8 never sees any discarded e-mail messages and merely receives the prioritization scheme created by the server 6 when the client 8 downloads the messages from the server 6. The client 8 is employed by a user (not shown) which views the e-mail messages in typical means via the client 8.

In the present invention, filtering or discrimination mechanisms are located on the client 8, not the server 6 (of course, as used herein, the terms client and server refer to the functionality as such, and any computer—even an individual's PC or an ISP computer—can be the client or server if it exhibits such functionality). The mechanisms are, for example, software or hardware filtering or discrimination means that prioritize or categorize communicated information received by the client 8. Although the client 8 receives all such communicated information from the server 6, the user views on the client 8 only the prioritized or categorized information because of the filtering or discrimination means resident at the client 8.

Figure 2:
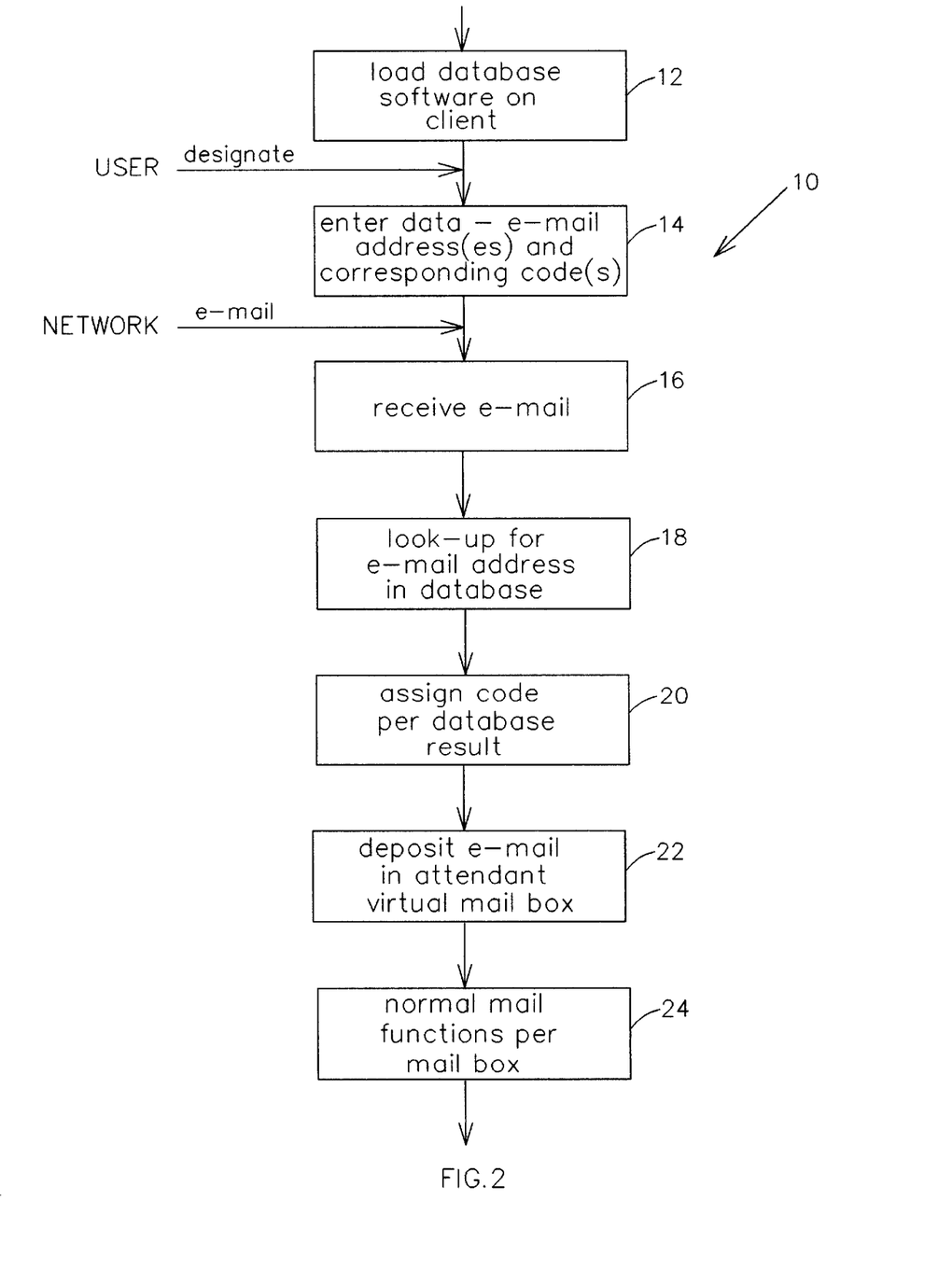
FIG. 2 is a flow diagram of the method of prioritizing and categorizing the present invention.
Figure 3:
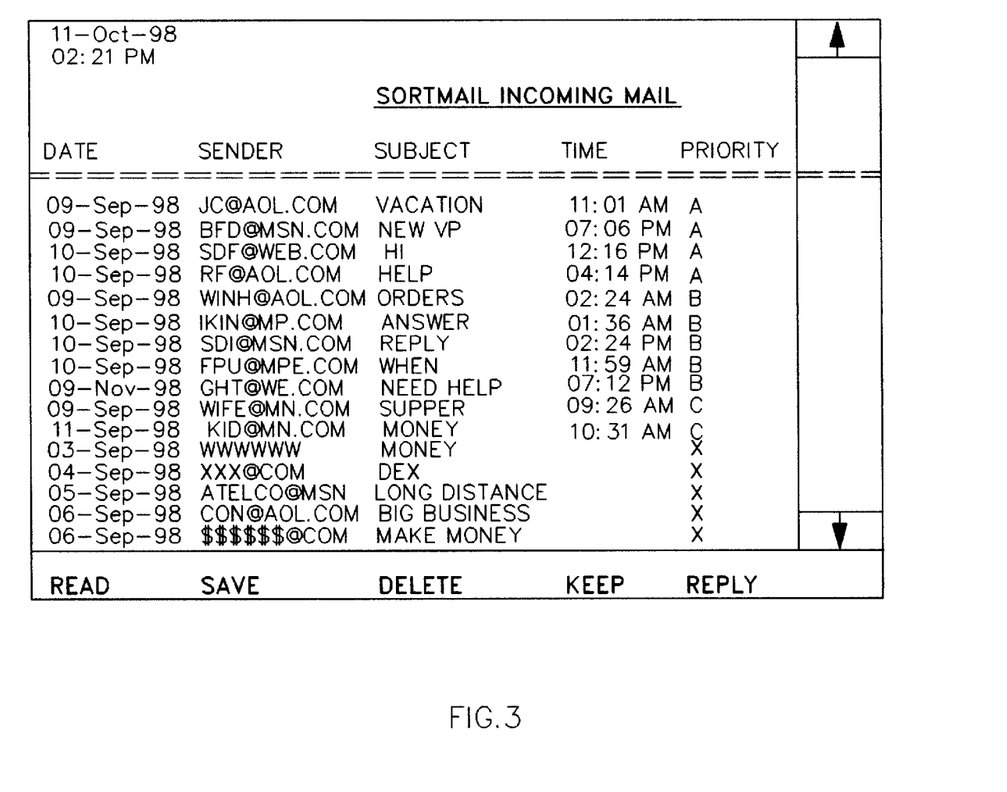
FIG. 3 is an exemplary screen image of a Windows-based prioritization of messages in a single virtual mailbox, as presented to the recipient client computer.

Referring to FIG. 2, in conjunction with FIG. 1, a method 10 commences in a step 12 of loading database software on the client 8. The database software loaded in the step 12 may be any conventional database that allows for custom prioritization among database elements or interaction between the database and additional customized software that performs such prioritization of elements of the database.

In a step 14, data is entered in the database on the client 8. The data includes identifiers of the source of information expected to be received by the client 8 from the communications network 2. In the case of e-mail to be received by the client 8, the data entered in the database is e-mail address identifiers, for example, the typical e-mail address format of: "name@domain.com." Of course, typical e-mail addresses have some variation, and the data entered in the database will correspond with each of those variations according to those sources from which e-mail messages are expected to be received by the client 8.

The e-mail address data entered in the database need not include every single e-mail address from which an e-mail message may be received by the client 8. The method 10, as later discussed, provides for prioritization based on the expected incoming e-mail messages (i.e., according to known e-mail address information, domain name information, or other similar characteristics). For unexpected e-mail messages from unknown e-mail addresses the prioritization provided by the method 10 is in accordance with the user's desires, as the user indicates at the client 8 (i.e., even though the database does not include data regarding the unexpected e-mail messages).

In a step 16, an e-mail message is received by the client 8. The e-mail message is received in conventional manner from the server 6 and the network infrastructure 4.

In a step 18 of the method 10, a lookup operation is performed by the client 8 based on software or hardware of the client 8. In this lookup operation of the step 18, the e-mail address of the received e-mail from the step 16 is compared to data indicative of e-mail addresses which are maintained in the database of the client 8. If the e-mail address is found in the data of the database of the client 8, then, the corresponding code in the database to that particular e-mail address data of the database indicates the priority be given the received e-mail.

Based on the hardware and software prioritization mechanisms maintained at the client 8, the received e-mail is then prioritized according to the code corresponding to the e-mail address as found in the database. This occurs in the step 20.

In a step 22, the e-mail message received by the client 8 is deposited in an attendant virtual mailbox maintained at the client 8. The virtual mailbox is either software or hardware of the client 8 that provides for mailbox functions. The mailbox functions are substantially conventional. However, the virtual mailbox of the client 8 provides added function of categorizing or prioritizing the received e-mail according to the assigned code from the step 20.

Several schemes for the characterization or prioritization are possible by the virtual mailbox, as those skilled in the art will understand and appreciate. For example, the received e-mail may be merely prioritized in a most-important-to-least-important descending order according to the particular assigned code. Alternatively, the received e-mail may be categorized in a more important or less important category according to arbitrary categories of codes that may be established at the client 8. The software or the hardware of the client 8 allows the user of the client 8 to determine the prioritization or caterogization scheme and to dictate in which particular priority or category incoming e-mail messages received by the client 8 should be placed or located.

In step 24, the software or hardware on the client 8 provides for normal e-mail functions in conventional manners, such as reply, forward, copy, delete, and others.

At any point in the method 10, the client 8 may receive additional e-mail messages in the step 16 and a user of the clients also may change the data in the database including to add expected e-mail addresses to the data, to change corresponding codes, and to vary the prioritization or categorization scheme then implemented on the client 8 via the software or hardware thereof.

Numerous alternatives and variations are possible in the embodiments described herein. For example, the client 8, by the foregoing prioritization schemes, can distinguish certain received communications for designated treatment. One possibility is that the client 8 can treat particular communications by forwarding or sending a copy of the communications to another designated address or number (such as to another computer's address or to another telephone's number). Alternatively, the client 8 can perform operations on or with the communication, for example, if the communication is data information for use in calculative processes. The client 8, furthermore, can have variable and multiple numbers of boxes or categories in which communications are maintained. Separate boxes or categories may be treated in a variety of manners by the client 8. Another possibility is that the sort performed be based on identifiers other than IP address, such as Internet domain name or other characteristics of received messages.

The following examples describe certain possible operations of the prioritization and characterization schemes of embodiments:

EXAMPLES

System 1

A database directory which is an address book can be found on most Internet connection services and Intranet services of large companies or as personal software in an individual's home or desktop computer. A priority field is added into this address book. The priority field is an alpha-numerical number which designates into which mail-box, of several virtual mailboxes configured at a user's (e.g., any client) computer, any incoming mail is directed. An infinite number of virtual mailboxes could be established, but, for example only, four such mailboxes are configured on the user's computer.

The following are the four mail-boxes used, with a corresponding priority code that relates to the respective box. The priority code is the alpha-numeric number of the priority field mentioned previously.

| Name - Mailbox | Priority Code |
| --- | --- |
| Inter-office mail | A |
| Priority Outside mail | B |
| Outside non-priority | C |

| Name - Mailbox | Priority Code |
| --- | --- |
| Junk/unsolicited | X |

The priority codes designated in the directory of addresses relates to each of the correspondents for incoming e-mail. Once assigned, any incoming mail is sorted through the database and based on a mail-box is assigned the respective priority code. If there is not a "match", i.e., the e-mail address is not in the directory, the e-mail is sent to the junk mailbox via the respective priority code for e-mail having addresses not contained in the directory. Alternatively, the e-mail recipient can reject all unsolicited (i.e., no corresponding address in the directory) mail unless it is coded as in System 2 below.

Figure 4:
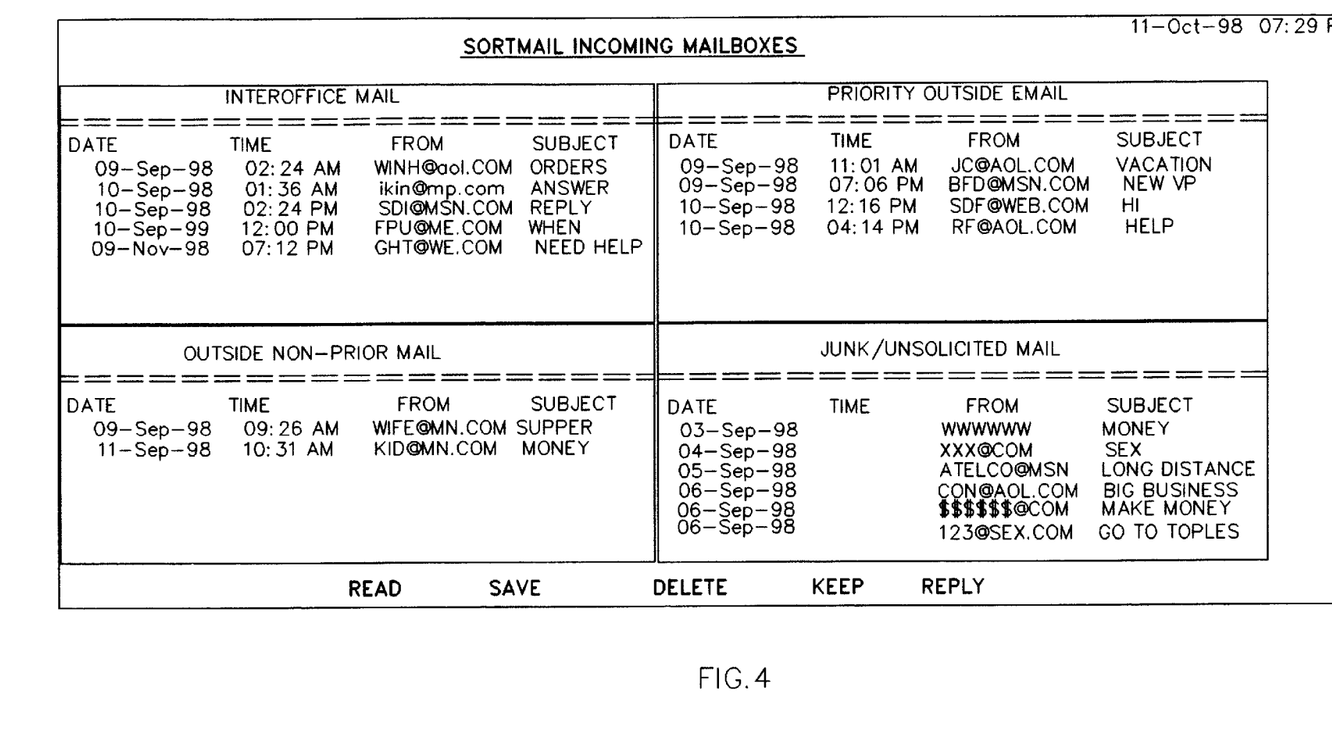
FIG. 4 is an exemplary screen image of a Windows-based categorization of messages among multiple virtual mailboxes (for example, four in the Figure), as presented to the recipient client computer.

Once directed to the correct relative mail-box, a master E-mail screen tells how many messages are in each mailbox. The user then has a choice of viewing the e-mails as the existing format E-mail comes in but prioritized or, in the alternative, the messages can be displayed in a Windows format with all mail-boxes displayed, as per FIG. 4. In either display method, particular e-mails can be highlighted and the message clicked to view, just like conventional E-mail systems. Once read, the message can be printed, answered or saved (e.g., in which case, the e-mail message would then go back into the mailbox message and appear in the future as a saved message). The recipient can save the e-mail in the manner desired, albeit at the end of all messages or left in order of date received using either format described above. The incoming E-mail address is, thus, used as the sort print and it is the main item to match.

A second method can be used in the following circumstances:

1. An address that is prioritized as "C"—however, it is desired to reply with a E-mail to that address and the reply is to be prioritized higher and so the E-mail should (rather than a "C" priority) show up as an "A" category, for a one time priority reply; or 2. An E-mail is to be sent to someone for the first time with a reply necessary, but it is not presently known how the reply should be prioritize. For example, we want to see the reply to this particular e-mail only, in a high priority category; or 3. If it is desired not to accept any E-mail from unknown parties or from particular parties, then such E-mail can be discarded or categorized so that it is treated as undesired. All of this is possible in the same manner of designating priority codes for desired addresses and other priority codes for undesired, less desired, or unknown addresses. To date, other types of E-mail require submission of the address to the blocked. In each circumstance in order to achieve the desired prioritization or categorization, a "priority alphanumeric code," called PAC, is created. A PAC is an alphanumeric field which can be any size, ranging from a single character to an infinite number of characters. The size of the field is determined by the extent of security and sorting desired. For example, a single character field is limited to 36 different possibilities, by expanding the field to four characters, the possibilities for the particular PAC increases to 36 to the $4^{th}$ power of possible combinations. By having a six character field, the possibilities for the particular PAC are increased to 36 to the $6^{th}$ power of possible combinations. Thus the greater the size allowed for the PAC field, the greater security (because of the increased number of PAC combinations possible as to which unwanted communications can be discarded) and the greater flexibility in variation of possible sort characteristics or categories (because each PAC could be categorized or otherwise treated in particular manner different from other different PACs).

For instance, as the following example shows, in sorting for priority using a 5 character PAC, a fine sort is achieved and increase in security level to 60-million combinations for hacker/SPAM protection is realized.

Use Mail-box "Inter-office Mail"

PAC#

A1100 to A1194—mail from executives

A1200 to A1299—mail from customer services

A1300 to A1394—mail from warehouse, etc.

In effect, by assigning a number between the A1100 to A1194 (e.g., executives) to a received message, the message at the user's computer anyone would appear higher in order than a message assigned A1200 to A1299 (e.g., customer service).

In similar fashion to the foregoing, a user automatically assign to each of several virtual mailboxes a PACs in the, series, for example, a, b, c, etc. series, to E-mail messages from addresses for which priority is denied. Such messages could merely, for example, appear in an order desired by the recipient user.

Further, assume the user is using a 5-character PAC. In this case assign:

a) Series of numbers AB101 to AB 499 which would be a one-time PAC and once given out/replied to would no longer be validated (e.g., if the person tried to use it again, it would automatically be rejected). With this series (and in the future, using any other combinations) one can assign the outgoing E-mail to "Reply PAC". When replied to by the user, then, this message would be directed to the a, b, c, etc., mailbox, based on how the PAC is designated as to priority.

All of the PAC numbers, and their categorization, prioritization, or other treatment, are automatically generated by the system based upon user-designated roles or instructions therefor, all of which, are implemented at the user's computer and are accessed via, for example, a Windows™ format.

Consequently, the PAC is sort of a reverse of what is commonly known as a PIN number used for cash machines, debit cards, and others. A PIN number is used to confirm authority to "take" out or use something to receive. A PAC, on the other hand, is employed to get into and tell the database the priority that a received message is to have. The PAC, on the other hand, is employed to get into and tell the database the priority that a received message is to have. The PAC is, thus, a mechanism to employ alphanumerics to provide for millions of possible combinations and at the same time allow for sequencing or other special designated treatment.

With such first method above, it is of note that the sender of a message does not learn the PAC (unless it is desired by the recipient that the sender be given the PAC, as discussed in other examples), as it is assigned by the recipient's computer based on address of the sender and as in the incoming communications is matched to the recipient computer's database and then forwarded to a proper mailbox.

In the second method, there are several ways that the PAC is assigned to the future sender of messages which will be received by the user. For example, a sample of an outgoing E-mail from (i.e., a E-mail format that the user is transmitting) can contain a space of field that indicates "PAC". In the space or field the intended recipient's particular known PAC can be inserted, either automatically by the user's computer form the user's database. As well, the outgoing E-mail form can contain space or field that indicates "reply PAC; or the like. If the user has assigned a particular priority code corresponding to the intended recipient of the outgoing e-mail, then once that, intended recipient is listed in the "to box" of the E-mail form, than an assigned PAC for the participated reply appears. However, it is desired that the particular reply of the intended recipient be assigned a different priority than the user's database automatically assigns to the recipient, a one time reply PAC is assigned by clicking on the field in the form and entering a choice. Choices can appear, for example, as follows:

"A database designated PAC" (e.g., CB623)

"B do you wish to change priority?"

"C do you wish to assign a one time PAC?"

The user could then click "C", for example, and assign a one time priority to the anticipated reply. The user's computer then generates the PAC from a pre-assigned level chosen. This particular PAC assigned for the one time priority is then discarded to prevent future assignment and any incoming reply E-mail with this PAC is assigned on the first incoming receipt only, to the desired priority mailbox. If the PAC is ever used again by the particular recipient making the reply, the incoming reply message will nonetheless be sent to a low priority box or, if rejected as not allowed because of the particular PAC, can be assigned to a particular mailbox or otherwise handled.

If the user instead clicks "B", the priority normally assigned to reply messages of the intended recipient can be varied up or down. For example, if a top priority is the normal assignment, then the user has the choice to move such incoming messages to another priority (e.g., messages can be moved to another categorical box appearing on the user's monitor).

Further, should a PAC not be desired for all incoming mail, such incoming mail that is not assigned a PAC can be placed in its own virtual mailbox away from PAC-designated messages or otherwise handled in the user's discretion. The user's database should be able to be updated with new or additional addresses from previously unlisted and unprioritized sources, by merely clicking or simply designating that the database should e updated with the information, without progressing through a long procedure of setting up the database or supplying the database with direct manual input.

Although the foregoing description primarily refers to a user's computer as performing the prioritization or categorization of incoming messages via the PAC Scheme, it should be understood that any computer in a network which is performing client functions can perform the described functions. Particularly, most E-mail is stored, displayed and answered by the host server, which is either the Internet provider or the corporate Intranet provider or a third party server. Any of these could adopt the "PAC" method of scrutinizing or prioritizing in accordance with the foregoing descriptions or similar procedures. If a host server of the type just described does not perform the prioritization or categorization functions with received e-mail (e.g., prior to download of the e-mails by the user), then all accumulated e-mails at the host server are downloaded by the user's computer and the user's computer performs the sort and distribution by priority, as earlier described in the example.

Voice Mail

Voice mail/phone mail or any other type of verbal message system, such as a recorder, answering machine with tape, digital answering machine, or other, can also perform the functions described herein.

A person can have up to 20 voice messages on some systems before the system fills up, and some systems may even have greater capacity. Assume that 10 new messages have been received. The user must typically go through each message and then skip, save or delete to obtain the next message. For example, only the seventh message is very important.

Solution: Sort Mail

Again, two method according to certain embodiments are possible. The first method is referenced to as "Automatic Sort" and the second method is referred to as "Manual Sort".

By using the telephone service provider's caller I.D. service, most incoming calls can be identified by the unique telephone number of the caller, except for:

a) Out of area;
b) Unavailable; and
c) Private.

or similar messages that do not display the name and number of the incoming caller. These unidentified caller messages require Manual Sort according to the methods. Analog cellular phones cannot use caller I.D., therefore, they also require Manual Sort. Systems that can accept caller I.D., however, for calls in which callers are identified by unique telephone numbers or other information, use Automatic Sort.

The database is set up in such a manner that by the touch tone handset, telephone numbers (with area codes) and priority levels and/or boxes are entered and designated. Just like with E-mail, the messages can be listed in order of priority or put in separate boxes and the user can jump among and between priorities, boxes, and messages to hear what is received.

For example, voice mail would say "you have 6 new messages and 3 saved messages." The method then generates sounds to the effect that "you have 3 new messages and 1 saved in priority one box, press 11 to listen"; "you have 2 new messages and 1 saved message in personal box, press 22 to listen"; you have 1 new message in low priority box, press 33 to listen,38 and so on.

The method, by pressing a pre-arranged sequence, allows the user to perform all functions of voice mail, but furthermore let the user jump from Box 11 to Box 22 or Box 33 and/or vice versa. Should the user not wish to hear the messages in separate boxes or should the user just want them prioritized in a single box, then the user has flexibility to designate that at the beginning of each new message check or otherwise.

The method of the Automatic Sort prioritizes telephone numbers by assigning a priority level corresponding to each call, identifiable via caller I.D. The incoming phone call identifying number is matched to a database and then prioritized, categorized, or forwarded, etc., according to the user's selected preferences. Assuming A, B, C, and X as designated priorities, for example, if 6 calls with A, C, priority arrive before 3 "B's" and 5 "A's", the method sorts so that the recipient can hear the messages in the following order—5 "A", 3 "B", 6 "C". The caller is not aware as to their priority and cannot be insulted. As new callers are received, they go to the lowest level but can be upgraded in priority at anytime.

In case the Automatic Sort cannot work for the reasons outlined above, Manual Sort is performed.

Manual Sort

Another technique, manual sort, is similar to E-mail method of using a PAC. One inserts in a database the PAC numbers, and assigns them a voice mailbox for storing messages. A four character field PAC serves the purpose. As one is using a telephone key pad to enter the PAC, the alphanumeric code can still be used, as all telephones have letters on each number. The only pitfall is that the four number PAC combinations fall to 9000 (0 is not used in the first field).

When one gives out a telephone number, the sender is given a PAC—when the sender calls, the voice answering mailbox says "at the tone, please leave your message or press * and enter PAC". This would be after the normal message which a recipient may use to identify itself. After the sender enters the PAC, the "beep" to record comes on and the message is left. The message is sorted by the database and directed to the designated mailbox.

To listen to messages, the user proceeds in the same manner as with the automatic method, and has similar choices as to method of priority, pick up, forwarding, etc.

The use of the publicly available caller I.D. is a valuable tool in checking data against the database. In addition to the above prioritizing/blocking and sorting of mail, further capabilities are possible, as follows:

1. For computers that have off site access by modem, only authorized modem connection can be allowed, thereby, stopping any attempted entry in the following way. The method can match number dialing in against allowed numbers. The allowed numbers are entered in advance and the unattended computer rejects all non-authorized numbers. For added protection, there is no back door for modem connection.

2. The method allows the following information to appear on the screen (in a position chosen by the computer user):

a) If a phone call is in-bound, displays telephone number and name;
b) If a voice message comes in while on the computer, integrates into a box and advises that voice mail in— — — mailbox. The user can proceed on or check;
c) If E-mail arrives while the computer is being used in any mode (Internet, Intranet or Off-line) a box displays messages in a designated box or from whom as the messages arrive.

The method generates the "b) & c)" applications above. The a) application is using the program and caller I.D.

Faxes

Lastly, the method can also be used to sort faxes as they come in using the same methods as the E-mail. The "sort" trigger is the incoming fax number, and by matching the database, pre-assigned boxes are established and the fax is directed to the appropriate pre-assigned box. Of course, forwarding of messages and other operations are possible. Faxes originating with numbers unknown or not in the database will go to the lowest level priority box.

It is to be understood that multiple variations, changes and modifications are possible in the aforementioned embodiments of the invention. Although illustrative embodiments of the invention have been shown and described, a wide variety of modification, change and substitution is contemplated in the foregoing disclosure and, in some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A method of prioritizing a received information message, a source of delivery of the received information message being indicated by a unique identifier accompanying the received information message, comprising:

receiving the received information message;

looking-up the unique identifier in a database;
assigning a code for the received information message based on a result from a step of looking-up wherein the code is maintained in the database and corresponds to the unique identifier in the database;
prioritizing the received information message according to the code; and
depositing the received information message into at least one of a plurality of virtual mailboxes wherein the received information message is sorted within such virtual mailbox(es) based on the code.

2. The method of claim 1, wherein each virtual mailbox in the plurality of virtual mailboxes performs a plurality of conventional mailbox functions.

3. The method of claim 1, wherein the received information message is an e-mail message and the unique identifier is an e-mail address corresponding to the e-mail message.

4. The method of claim 1, wherein the received information message is a voice-mail message and the identifier is a telephone number corresponding to the voice-mail message.

5. The method of claim 1, wherein the received information message is a fax and the identifier is a fax number corresponding to the fax.

6. The method of claim 1, wherein at least one step of the method is performed by a client selected from a group comprising at least one of the following: a computer, a message storage device, and a combination of a computer and a message storage device.

7. A system for sorting a received information message, a source of delivery of the message being indicated by a unique identifier accompanying the received information message, the system including a database maintaining a plurality of known identifiers and a plurality of desired codes corresponding to the known identifiers, the system also including a designated code different from the desired codes, comprising:
means for receiving the received information message;
means for looking-up the unique identifier in the database and determining whether the unique identifier corresponds to any of the known identifiers in the database;
a data code, the data code being: (i) a single desired code from the plurality of desired codes (a) that corresponds to a single known identifier from the plurality of known identifiers in the database and (b) that corresponds to the unique identifier if the unique identifier corresponds to one of the known identifiers; or (ii) the designated code;
means for assigning the data code to the received information message; and
means for prioritizing the received information message according to the data code into at least one of a plurality of virtual mailboxes wherein the received information message is sorted within such virtual mailbox(es) based on the data code.

8. The system of claim 7, wherein each virtual mailbox in the plurality of virtual mailboxes performs a plurality of conventional mailbox functions.

9. The system of claim 7, wherein the received information message is an e-mail message and the unique identifier is an e-mail address corresponding to the e-mail message.

10. The system of claim 7, wherein the received information message is a voice-mail message and the unique identifier is a telephone number corresponding to the voice-mail message.

11. The system of claim 7, wherein the received information message is a fax and the unique identifier is a fax number corresponding to the fax.

12. The system of claim 7, wherein the system is a client selected from a group comprising at least one of the following: a computer, a message storage device, and a combination of a computer and a message storage device.

13. A computer-readable medium of instructions and data, comprising:
a unique identifier corresponding to a received information message;
means for receiving the received information message and the unique identifier;
a database containing a plurality of known identifiers and a plurality of desired codes respectively corresponding to the known identifiers;
a designated code;
means for looking-up the unique identifier in the database and determining whether the unique identifier corresponds to any one of the known identifiers in the database;
a data code, the data code being: (i) a single desired code from the plurality of desired codes that corresponds to a single known identifier from the plurality of known identifiers in the database that corresponds to the unique identifier if the unique identifier corresponds to one of the known identifiers; or (ii) the designated code;
means for assigning the data code to the received information message; and
means for depositing the received information message into at least one of a plurality of virtual mailboxes wherein the received information message is sorted within such virtual mailbox(es) based on the data code.

14. A system for sorting a received information message, comprising an alphanumeric identifier accompanying the received information message (a) wherein the alphanumeric identifier is used to prioritize the received information message into at least one of a plurality of virtual mailboxes and (b) wherein the received information message is sorted within such virtual mailbox(es) based on the alphanumeric identifier.

15. The system for sorting a received information messages of claim 14 wherein the received information message is an e-mail message and the alphanumeric identifier is an e-mail address corresponding to the e-mail message.

16. The system for sorting a received information messages of claim 14 wherein the received information message is an e-mail message and the alphanumeric identifier is a priority alphanumeric code corresponding to the e-mail message.

17. The system for sorting a received information messages of claim 14 wherein the received information message is a voice-mail message and the alphanumeric identifier is a telephone number corresponding to the voice-mail message.

18. The system for sorting a received information messages of claim 14 wherein the received information message is a voice-mail message and the alphanumeric identifier is a priority alphanumeric code corresponding to the voice-mail message.

19. The system for sorting a received information messages of claim 14 wherein the received information message is a fax and the alphanumeric identifier is a fax number corresponding to the fax.

20. The system for sorting a received information messages of claim 14 wherein the received information message is a fax and the alphanumeric identifier is a priority alphanumeric code corresponding to the fax.

21. A method of prioritizing a voice-mail message, a source of delivery of the voice-mail message being indicated by a unique identifier accompanying the voice-mail message, the method comprising:

receiving the voice-mail message;

looking-up the unique identifier in a database;

assigning a code for the voice-mail message based on a result from a step of looking-up wherein the code is maintained in the database and corresponds to the unique identifier in the database;

prioritizing the voice-mail message according to the code; and depositing the voice-mail message into at least one of a plurality of virtual mailboxes wherein the voice-mail message is sorted within such virtual mailbox(es) based on the code.

22. The method of claim 21, wherein each virtual mailbox in the plurality of virtual mailboxes performs a plurality of conventional voice-mail mailbox functions.

23. The method of claim 21, wherein at least one step of the method is performed by a client selected from a group comprising at least one of the following: a computer, a voice-mail message storage device, and a combination of a computer and a voice-mail message storage device.

24. The method of claim 21, wherein the unique identifier is a telephone number corresponding to the voice-mail message.

25. The method of claim 21, wherein the unique identifier is a priority alphanumeric code corresponding to the voice-mail message.

26. A system for sorting a voice-mail message, a source of delivery of the message being indicated by a unique identifier accompanying the voice-mail message, the system including a database maintaining a plurality of known identifiers and a plurality of desired codes corresponding to the known identifiers, the system also including a designated code different from the desired codes, comprising:

means for receiving the voice-mail message;

means for looking-up the unique identifier in the database and determines whether the unique identifier corresponds to any of the known identifiers in the database;

a data code, the data code being: (i) a single desired code from the plurality of desired codes (a) that corresponds to a single known identifier from the plurality of known identifier corresponds to one of the known identifiers; or (ii) the designated code;

means for assigning the data code to the voicemail message; and means for prioritizing the voicemail message according to the data code into at least one of a plurality of virtual mailboxes wherein the voicemail message is sorted within such virtual mailbox(es) based on the data code.

27. The system of claim 26, wherein each virtual mailbox in the plurality of virtual mailboxes performs a plurality of conventional voicemail mailbox functions.

28. The system of claim 26, wherein the system is a client selected from a group comprising at least one of the following: a computer, a voicemail message storage device, and a combination of a computer and a voicemail message storage device.

29. The method of claim 26, wherein the unique identifier is a telephone number corresponding to the voicemail message.

30. The method of claim 26, wherein the unique identifier is a priority aplhanumeric code corresponding to the voice-mail message.

31. A computer-readable medium of instructions and data, comprising:

a voicemail message;

a unique identifier corresponding to the voicemail message wherein the unique identifier is a telephone number corresponding to the voicemail message;

means for receiving the voicemail message and the unique identifier;

a database containing a plurality of know identifiers and a plurality of desired code respectively corresponding to the known identifiers;

a designated code;

means for looking-up the unique identifier in the database and determining whether the unique identifier corresponds to any one of the known identifiers in the database;

a data code, the data code being: (i) a single desired code from the plurality of desired codes that corresponds to a single known identifier from the plurality of known identifiers in the database that corresponds to the unique identifier if the unique identifier corresponds to one of the known identifiers; or (ii) the designated code;

means for assigning the data code to the voicemail message; and means for depositing the voicemail message into at least one of a plurality of virtual mailboxes wherein the voicemail message is sorted within such virtual mailbox(ex) based on the data code.

32. The computer-readable medium of instructions of claim 31, wherein the unique identifier is a telephone number corresponding to the voicemail message.

33. The computer-readable medium of instructions of claim 31, wherein the unique identifier is a priority alphanumeric code corresponding to the voicemail message.

* * * * *

UNITED STATES PATENT AND TRADEMARK OFFICE
CERTIFICATE OF CORRECTION

PATENT NO. : 6,351,764 B1
DATED : February 26, 2002
INVENTOR(S) : Voticky et al.

It is certified that error appears in the above-identified patent and that said Letters Patent is hereby corrected as shown below:

Column 13,
Line 44, insert -- identifiers in the database and (b) that corresponds to the unique identifier in the unique -- direclty after "plurality of known".

Signed and Sealed this

Sixth Day of August, 2002

Attest:

JAMES E. ROGAN
Attesting Officer *Director of the United States Patent and Trademark Office*